(12) United States Patent
Wooldridge

(10) Patent No.: US 6,654,859 B2
(45) Date of Patent: Nov. 25, 2003

(54) NUMA PAGE SELECTION USING COLORING

(75) Inventor: James L. Wooldridge, Fall City, WA (US)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 09/916,723

(22) Filed: Jul. 26, 2001

(65) Prior Publication Data

US 2003/0023824 A1 Jan. 30, 2003

(51) Int. Cl.$^7$ ............................................... G06F 12/00
(52) U.S. Cl. ......................................... 711/147; 711/203
(58) Field of Search ................................. 711/147, 148, 711/200, 202, 203, 210

(56) References Cited

U.S. PATENT DOCUMENTS

| | | | | |
|---|---|---|---|---|
| 5,860,095 A | | 1/1999 | Iacobovici et al. | 711/119 |
| 5,913,222 A | * | 6/1999 | Liedtke | 711/3 |
| 6,009,503 A | * | 12/1999 | Liedtke | 711/203 |
| 6,112,286 A | | 8/2000 | Schimmel et al. | 711/208 |
| 6,167,437 A | | 12/2000 | Stevens et al. | 709/214 |
| 6,347,364 B1 | * | 2/2002 | Liedtke | 711/163 |
| 6,370,622 B1 | * | 4/2002 | Chiou et al. | 711/146 |
| 6,381,735 B1 | * | 4/2002 | Hunt | 717/158 |
| 2002/0072830 A1 | * | 6/2002 | Hunt | 701/1 |

OTHER PUBLICATIONS

US 6,021,479, 2/2000, Stevens (withdrawn)
Nagar, "Windows NT File Systems Internals: A Developer's Guide", O'Reilly & Associates, Inc., 1997, pp. 194–242.
Lynch, "Page Coloring", Research In Computer Architecture by Michael J. Flynn, Dec. 1994.

* cited by examiner

Primary Examiner—Kevin Verbrugge
(74) Attorney, Agent, or Firm—Rochelle Lieberman

(57) ABSTRACT

A method of efficiently increasing intra-nodal page allocations and increasing processor cache utilization in a multi-processing environment is provided. Each physical page of memory is identified and organized according to the page color as well as the nodal identifier. The organization process places each of the pages into a logical data structure. Both the identification and organization steps allow the system to properly select a page based upon both page color and nodal locale. In addition, the selection process updates the preferred page color for a subsequent page allocation. Accordingly, the method of identifying and organizing each page of memory enables an application to efficiently select pages with good processor cache distribution.

29 Claims, 3 Drawing Sheets

NUMA PAGE SELECTION USING COLORING

BACKGROUND OF THE INVENTION

1. Technical Field

This invention relates to memory page selection in a multiprocessor computing environment. More specifically, the invention implements a selection policy based upon both nodal identification and page color.

2. Description of the Prior Art

Multiprocessor systems contain multiple processors (also referred to herein as "CPUs") that can execute multiple processes or multiple threads within a single process simultaneously in a manner known as parallel computing. In general, multiprocessor systems execute multiple processes or threads faster than conventional single processor systems, such as personal computers, that execute only one thread at a time. The actual performance advantage is a function of a number of factors, including the degree to which parts of a multithreaded process and/or multiple distinct processes can be executed in parallel and the architecture of the particular multiprocessor system. The degree to which processes can be executed in parallel depends, in part, on the extent to which they compete for exclusive access to shared memory resources.

Shared memory multiprocessor systems offer a common physical memory address space that all processors can access. Multiple processes therein, or multiple threads within a process, can communicate through shared variables in memory in which all the processes read or write to the same memory location in the computer system. Message passing multiprocessor systems, in contrast to shared memory system, have a separate memory space for each processor. They require processes to communicate through explicit messages to each other.

The architecture of shared memory multiprocessor systems may be classified by how their memory is physically organized. In distributed shared memory (DSM) machines, the memory is divided into modules physically placed near one or more processors. Although all of the memory modules are globally accessible, a processor can access local memory on its node faster than remote memory on other nodes. Because the memory access time differs based on memory location, such systems are also called non-uniform memory access (NUMA) machines. In symmetrical shared memory machines, on the other hand, the memory is physically in one location. Symmetrical shared memory computers are called uniform memory access (UMA) machines because the memory is equidistant in time for each of the processors. Both forms of memory organization typically use high-speed caches in conjunction with main memory to reduce execution time.

For systems with a physically indexed cache, operating systems may utilize a page color scheme to identify pages of memory and their physical placement in the cache, thereby increasing the average cache hit rate. The page color scheme allows the operating system to work with physically indexed caches to commit pages that have good processor cache utilization properties. Page coloring uses the operating system, or resource control software, to control the mapping of virtual addresses to physical addresses by controlling the physical memory page to which virtual pages are allocated. In the case of physically indexed caches, the lower address bits in a page address is used as a cache index. Accordingly, the operating system commits real physical memory pages according to how they layout in the cache.

The prior art page coloring method functions well in a UMA computer system and provides good processor cache utilization properties. However, this method does not provide efficient results in a NUMA system. Specifically, the prior art page coloring method selects pages that have an inverse probability of being on the same node as the current processor in a NUMA system, as well as being on the same node as previous or future allocations. Accordingly, it is desirable to develop a page coloring method for use in a NUMA operating environment which overcomes the limitation of the prior art.

SUMMARY OF THE INVENTION

This invention comprises a method for selecting physical pages of memory in multiprocessing computer environment. The page selection process enables the operating system or other resource controlling software to request memory pages for a specified process, or other scheduled entity, on a specified node wherein the selected pages have good processor cache distribution.

A first aspect of the invention is a method of increasing application performance in a multiprocessor computer system. Intra-nodal page allocations are increased and processor cache utilization is increased. Each physical page of memory is identified according to a nodal page color. In addition, each page of memory is organized into a data structure based upon the nodal page color. For each process a preferred node is selected, as well as a preferred page color. Processor cache utilization is increased by incrementing the page color for a subsequent page allocation. The preferred page color is updated during the subsequent page allocation.

A second aspect of the invention is a multiprocessor computer system including a memory manager to increase intra-nodal page allocations and a process manager to increase cache utilization. The memory manager identifies each physical page of memory according to a nodal page color and organizes each physical memory page into a data structure according to the nodal page color. Thereafter, the process manager selects a preferred node for the process. Following the selection of a preferred node, the process manager selects a preferred page color for the process. The process manager increments the page color for a subsequent page allocation, and updates the preferred page color during the subsequent page allocation:

A third aspect of the invention is an article comprising a computer-readable signal bearing medium with multiple processors operating within the medium. The article includes means in the medium for increasing intra-nodal page allocations, and means in the medium for increasing processor cache utilization. The means for increasing intra-nodal page allocations includes a memory manager to identify a page of memory according to a nodal page color. The memory manager organizes the pages of memory into a data structure based upon the nodal page color. In addition, the means for increasing intra-nodal page allocations includes a process manager to select a preferred node for a process and a preferred page color. The means for increasing processor cache utilization includes a process manager to increment the page color for a subsequent page allocation, and to update the preferred page color during the subsequent page allocation.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Figure 1:
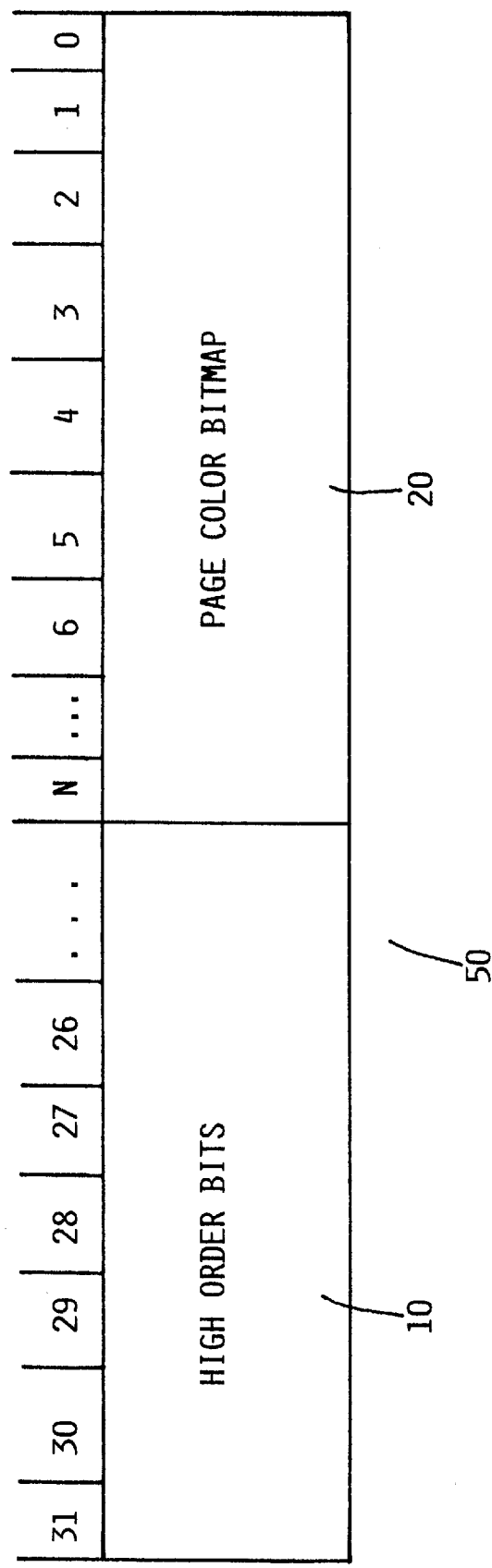
FIG. 1 is a block diagram showing a page color bitmap representation.

The nodal page coloring scheme of the preferred embodiment is an extension of the prior art page coloring scheme. The preferred embodiment provides a calculation for a nodal page color for each page of memory. Nodal page color is the combination of a page color and a node identifier. There are three components to the nodal page coloring scheme: nodal page identification, page organization by nodal page color, and page selection. Accordingly, the nodal page coloring scheme reflects the placement of the page within a multi-processing system having one or more nodes.

In a symmetrical multiprocessing computer environment, the prior art page coloring scheme is sufficient for processor cache efficiency. The prior art page coloring model does not account for a distributed shared memory multiprocessing computer environment, such as a NUMA system. The preferred embodiment utilizes the page color identification and characterization of pages of memory with respect to the cache of the prior art. In addition, the preferred embodiment provides a nodal page color for identifying the node in which the pages of memory reside. A nodal page color is the aggregate of the page color and the nodal identifier and provides a binary signature for identifying both the page location with respect to the cache and with respect to a specific node in the system. Accordingly, the preferred embodiment utilizes the page color of the prior art to provide a nodal page color for pages of memory.

Nodal Page Coloring

The first component of the nodal page coloring scheme is the physical characterization of pages of memory. In order to properly select and allocate a page for a specific process, each page in the system must be characterized and identified. The first step in characterizing the computing system is to determine the number of page colors (NPC). The following is the equation for calculating the NPC:

$$NPC = (\text{cache size})/(\text{physical page size}) \qquad \text{Equation 1}$$

In the case where NPC is an even power of two, the number of bits defining the page color is calculated by: $\log_2(NPC)$.

The number of page colors is calculated using the same factors as in the prior art. This enables the nodal page coloring scheme to take advantage of the prior art processor cache efficiency. Following calculation of the NPC, the number of nodal page colors in the system (NNPC) is calculated as follows:

$$NNPC = (\text{number of } NUMA \text{ nodes}) * (NPC) \qquad \text{Equation 2}$$

wherein, the number of page colors among all the nodes is the product of the number of page colors multiplied by the number of nodes in the system. For example, in a four node system with 2 MB of processor cache and 4 KB page size, the following data would be accurate:

$$NPC = 2MB/4KB = 512$$

$$NNPC = 4*512 = 2048$$

The page color may be represented in a bitmap, i.e. in a binary representation. The bit-wise representation of page color identifies the page color in the page address. With knowledge of the bitmap, bitmask variables can be initialized to screen bits that are not relevant for purposes of determining page color. In the case where NPC is an even power of two, a page color bitmask can be calculated as follows:

$$PCBM = NPC - 1 \qquad \text{Equation 3}$$

where PCBM represents the quantity of relevant bits in a page number for defining the page color.

For any physical page in a NUMA system, the page color can be calculated using the following equation $$PC = PN[\text{bitwise AND}]PCBM \qquad \text{Equation 4}$$

where PC is the page color and PN is the page address shifted to the right by $\log_2$ of the page size.

Figure 2:
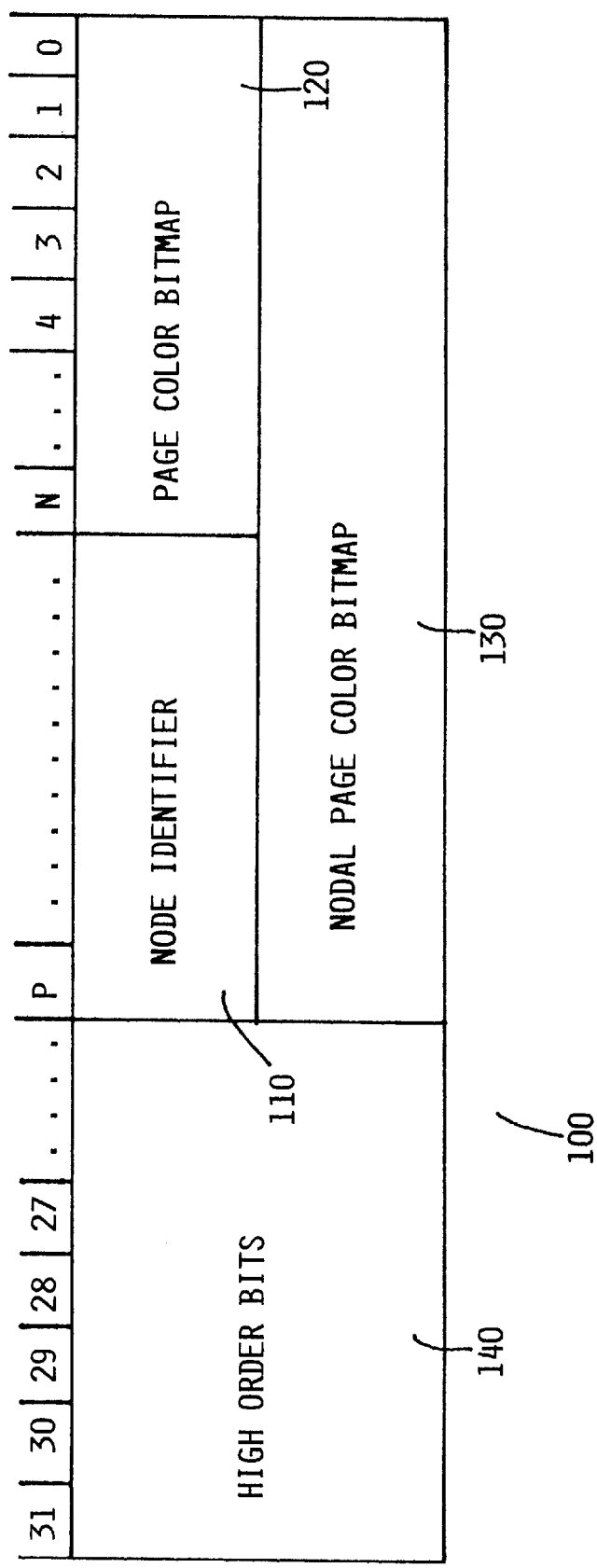
FIG. 2 is a block diagram showing a bitmap representation of the nodal page color.

FIG. 1 is a graphical illustration 50 showing a binary representation of the page color bitmap in a 32 bit address. The variable N is the highest order bit in the bitmap 20. The high order bits 10 are not used for the page color bitmap, however they are shown for completeness of the bitwise representation. FIG. 2 is a graphical illustration showing a binary representation of the nodal page color bitmap 100. The nodal page color bitmap 130 is a logical aggregate of the page color bitmap 120 and the node identifier 110. The high order bits 140 are not used for page color identification, however they are shown for completeness of the binary representation. The variable P denotes the highest order bit in the nodal page color bitmap 110, and the variable N represents the highest order bit of the page color bitmap 20, 120. Accordingly, FIGS. 1 and 2 are graphical representations of the nodal page color with respect to the binary address of a page.

In conjunction with the nodal page color bitmap of FIG. 2, an alternative manner of defining number of page color characteristics is as follows in a system where the quantity of nodes is based on an even power of two:

$$2^{**}(N+1) = \text{Number of Page Colors} \qquad \text{Equation 5}$$

$$2^{**}(P-N) = \text{Number of Nodes} \qquad \text{Equation 6}$$

$$2^{**}(P+1) = \text{Number of Nodal Page Colors} \qquad \text{Equation 7}$$

Figure 3:
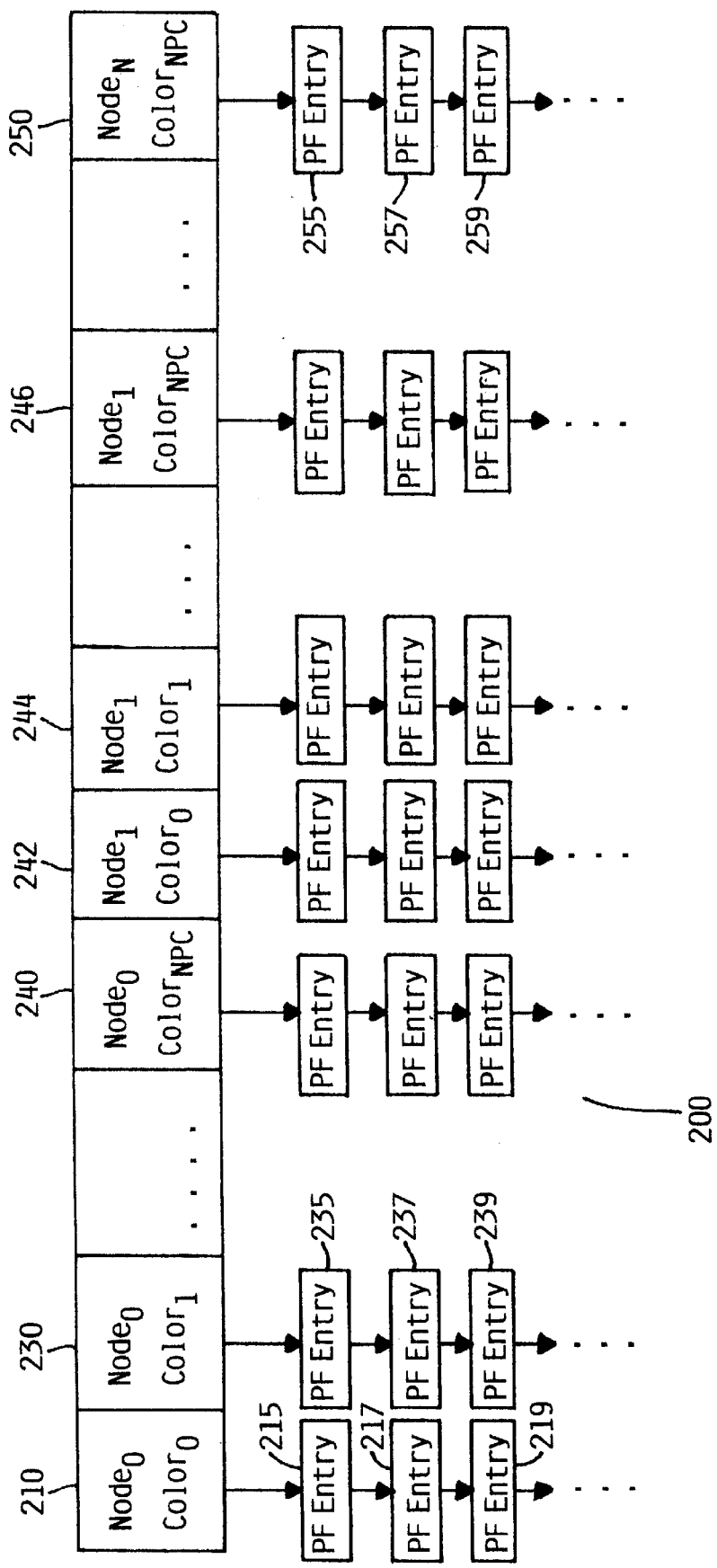
FIG. 3 is a block diagram of the linked list of the nodal page colors according to the preferred embodiment of this invention, and is suggested for printing on the first page of the issued patent.

For any physical page in a multi-nodal system, the nodal page color can be calculated in binary form as follows:

$$nPC = (PHN[\text{bit shifted left by}](\log_2(NPC))[\text{bitwise OR}]PC \qquad \text{Equation 8}$$

where PHN is the home node identifier of the physical page, and PC is the page color from Equation 4, and NPC is the number of page colors from Equation 1. Therefore, for any physical page number in the system, the nodal page color may be calculated. The nodal page color provides data that is used to identify pages of memory according to the pages of a specific node. The pseudocode for calculating nodal page color using equations 1–8 is as follows:

1. Get the home node for this page.
2. Get the size of the cache.
3. Get the page size used by the operating system.
4. Calculate the number of page colors, i.e. Equation 1.
5. Initialize the Page Color Bitmask.
6. Calculate the nodal color shift, i.e. Nodal Color Shift= $Log_2$ (Number of Page Colors)
7. Determine the color of this page, i.e. Page Color=Page Number [bit wise AND] Page Color Bitmask
8. Determine the Nodal Page Color of this page, i.e. Nodal Page Color=(Node Identifier [bit shift left by] Nodal Color Shift) [bitwise OR] PC Physical Page Placement by Nodal Page Color Once the nodal page color has been calculated, it is critical to organize the physical pages in a manner that recognizes the nodal page color. In a preferred embodiment, a data structure is provided to organize the pages according to nodal color. A linked list is one type of data structure, wherein each list contains pages of a common nodal page color. However, alternative forms of data structures may be used to logically store and organize pages according to nodal page color. FIG. 3 is an illustration of one form of a linked list 200 of the physical pages in a multinode system. For each node there are associated page colors. There are typically multiple pages of the same color on the same node. Each list within the data structure will have page entries for each color. The first list for the first node, $Node_0$ will have color entries beginning at $Node_0$ $Color_0$ shown at 210, and will have multiple entries 215, 217, 219 for multiple pages of memory for $Node_0$ $Color_0$. The second list 230 will begin with $Node_0$ $Color_1$ and will have multiple entries 235, 237, 239 for multiple pages of memory at $Node_0$ $Color_1$. Each list will be for a specific node and a specific color. In general, there are multiple pages of memory for a specific color on each node. The final list for $Node_0$ will be for pages having a maximum color equivalent to the number of page color, i.e. $Node_0 Color_{NPC}$ 240. There will be similar lists for $Node_1 Color_0$ 242, $Node_1 Color_1$ 244 through $Node_1 Color_{NPC}$ 246, as well as separate lists for the remaining nodes in the system. The final list 250 in the data structure will have page entries for $Node_N$ $Color_{NPC}$ 255, 257, 259. Each of the lists for each node is organized in a logical manner into a data structure. Although the data structure 200 shows only three entries for pages of memory for each nodal page color, the list is merely illustrative. There may be multiple page entries in excess of the three pages shown. This organization allows the system to access physical pages on a particular node with good page coloring. Accordingly, the linked list utilizes the nodal color characterization to organize physical pages of memory according to node identification and page color attributes.

As shown in FIG. 3 each page is organized in a data structure according to its nodal identification and page color. Every page may be inserted into the appropriate linked list. The pseudo code for inserting a page element into the correct list is as follows:

1. Get the page number for this element.
2. Get the nodal page color for this page.
3. Insert the page element into the linked list for that nodal page color.

In addition to inserting page elements into the linked lists, page elements may also be removed from the lists. The pseudocode for removing a page element from the appropriate linked list and returning it to the caller is as follows:

1. Remove element from the linked list of the appropriate nodal page color.

The organization of the physical pages according to nodal page coloring into a logical data structure enables the operating system to leverage memory page allocation by selecting a preferred node for every process in the system. Each node can have multiple color chains. However, each list identifies and organizes a single color chain for a single node. The data structure is only one form of an organization of all the nodal page color lists. It provides a methodical organization of each page of memory according to nodal color attributes.

The identification of each page color and node identifier, together with the organization of the nodal page color is all utilized in the process of selecting a node and the appropriate pages based upon color for an operation. Each process is assigned a preferred node by the operating system. The selection of the preferred node may be based upon process attributes or system loads, or even based upon a random or round robin selection. Following the selection of the node, an initial page color is selected. The pseudocode for the operating system initializing the preferred nodal page color, i.e. the assigned node identifier and the preferred page color, for a process is as follows:

1. Get the number of nodes in the system.
2. Calculate the number of page colors.
3. Initialize the processes preferred node.
4. Initialize the processes preferred page color.

As each process in the system issues memory allocation requests, the operating system services the request using the preferred page color on the preferred node. Following a page allocation, the operating system increments the preferred page color for subsequent page allocations. This ensures that subsequent page allocations will be sequentially colored, and that subsequent page allocations for the same process will remain on the same node, if available. Accordingly, the page selection process ensures that subsequent page requests are performed intra nodal.

The pseudocode for servicing a process memory allocation request is as follows:

1. Remove a page element of the preferred nodal page color list.
2. Get the size of cache.
3. Get the page size used by the operating system.
4. Calculate the number of page colors.
5. Initialize the page color bit mask.
6. Increment the preferred nodal page color, such that the next preferred page will have the same node identifier as the previous allocation with an incremented page color value modulo NPC.
7. Update the preferred nodal page color for this process' next allocation.

Each process is assigned a preferred node. Following selection of the preferred node, the operating system allocates subsequent pages for the same operation from the same node. This process provides efficient use of memory addresses for a single application. Accordingly, the characterization of each page of memory according to nodal page color and page color provides support for sequential color allocations on an intra node basis.

Advantages Over the Prior Art

The prior art page coloring schemes are not designed for a NUMA based system. In general, the prior art page color method selects pages that have an inverse probability of being on the same node as the current processor, as well as being on the same node as a related process. The nodal page color scheme of the preferred embodiment identifies and organizes each page of memory based upon page color and nodal identifier. Pages are then selected based upon these characteristics. This increases the processor cache utilization by improving the average cache miss rate and/or increasing the average cache hit rate. Accordingly, the nodal page color identification, organization and selection provides an enhanced performance benefit without requiring changes to the application.

Alternative Embodiments

It will be appreciated that, although specific embodiments of the invention have been described herein for purposes of illustration, various modifications may be made without departing from the spirit and scope of the invention. In particular, the invention is not limited to use in a NUMA multiprocessing system. The identification, organization and selection of memory pages may be applied to any multi-node multiprocessing system in which increased intra-nodal page allocations and increased processor cache utilization are desired. In addition, the linked list form of the data structure is one embodiment of organizing nodal page color. However, alternative forms of organization may be employed to catagorize each of the identified pages based upon color and node identification. Accordingly, the scope of protection of this invention is limited only by the following claims and their equivalents.

I claim:

1. A method for increasing application performance in a computer system having one or more nodes, comprising:
   (a) identifying each physical page of memory according to a nodal page color;
   (b) organizing each page of physical memory into a data structure based upon said nodal page color; and
   (c) selecting a preferred node and a preferred page color for a process.

2. A method for increasing application performance, comprising:
   (a) identifying each physical page of memory according to a nodal page color; and
   (b) selecting a preferred page color and a preferred node for a process based upon said nodal page color.

3. The method of claim 2, wherein said nodal page color is said preferred node and said preferred page color.

4. The method of claim 2, wherein the step of selecting a preferred node for a process increases intra-nodal page allocation.

5. The method of claim 2, wherein the step of selecting a preferred page color for a process increases processor cache utilization.

6. The method of claim 2, further comprising organizing each page of memory into a data structure based upon said nodal page color.

7. The method of claim 2, further comprising incrementing said page color for a subsequent page allocation.

8. The method of claim 7, further comprising updating said preferred page color during said subsequent page allocation.

9. The method of claim 2, wherein the step of selecting said preferred node is selected from the group consisting of round robin, random, process attributes, and system load.

10. The method of claim 2, wherein the step of selecting a preferred page color for a process includes improving an average cache miss rate.

11. The method of claim 2, wherein the step of selecting a preferred page color for a process includes increasing an average cache hit rate.

12. A computer system comprising:
    multiple processors arranged in one or more nodes;
    a memory manager to identify a physical page of memory according to a nodal page color and to select a preferred node for a process; and
    a process manager to select a preferred page color for said process.

13. The system of claim 12, wherein said nodal page color is said preferred node and said preferred page color for said process.

14. The system of claim 12, further comprising a data structure to organize said page of memory according to said nodal page color.

15. The system of claim 12, wherein said process manager increments said page color for a subsequent page allocation.

16. The system of claim 15, wherein said process manager updates said preferred page color during said subsequent page allocation.

17. The system of claim 12, wherein said selection of the preferred node is selected from the group consisting of: round robin, random, process attributes, system load, and combinations thereof.

18. An article comprising:
    a computer-readable signal bearing medium;
    means in the medium for identifying a page of memory according to a nodal page color; and
    means in the medium for selecting a preferred node for a process based upon said nodal page color.

19. The article of claim 18, wherein said means for selecting a preferred node for a process increases intra-nodal page allocation for a process.

20. The article of claim 18, further comprising means in the medium for increasing processor cache utilization based upon a page color selection for a process.

21. The article of claim 18, wherein the medium is selected from the group consisting of: a recordable data storage medium, and a modulated carrier signal.

22. The article of claim 18, wherein the means for identifying said page of memory includes a memory manager.

23. The article of claim 18, further comprising a data structure to organize said page of memory based upon said nodal page color.

24. The article of claim 18, wherein said means for selecting a preferred node for a process is a memory manager.

25. The article of claim 18, wherein said selection of the preferred node is selected from the group consisting of: round robin, random, process attributes, system load, and combinations thereof.

26. The article of claim 20, wherein said means for increasing processor cache utilization is a process manager.

27. The article of claim 26, wherein said process manager selects a preferred page color for said process.

28. The article of claim 26, wherein said process manager increments said preferred page color for a subsequent page allocation.

29. The article of claim 28, wherein said process manager updates said preferred page color during said subsequent page allocation.

* * * * *

UNITED STATES PATENT AND TRADEMARK OFFICE
CERTIFICATE OF CORRECTION

PATENT NO. : 6,654,859 B2  
DATED : November 25, 2003  
INVENTOR(S) : James L. Wooldridge It is certified that error appears in the above-identified patent and that said Letters Patent is hereby corrected as shown below:

Column 4,  
Line 58, Equation 8 should read:  
-- nPC = (PHN [bit shifted left by] ($\log_2$ (NPC)) [bitwise OR] PC --

Signed and Sealed this

Twentieth Day of January, 2004

JON W. DUDAS  
*Acting Director of the United States Patent and Trademark Office*